May 22, 1928.
J. E. LANGFORD
1,670,457
AUXILIARY DRIVING MECHANISM
Filed Jan. 31, 1927
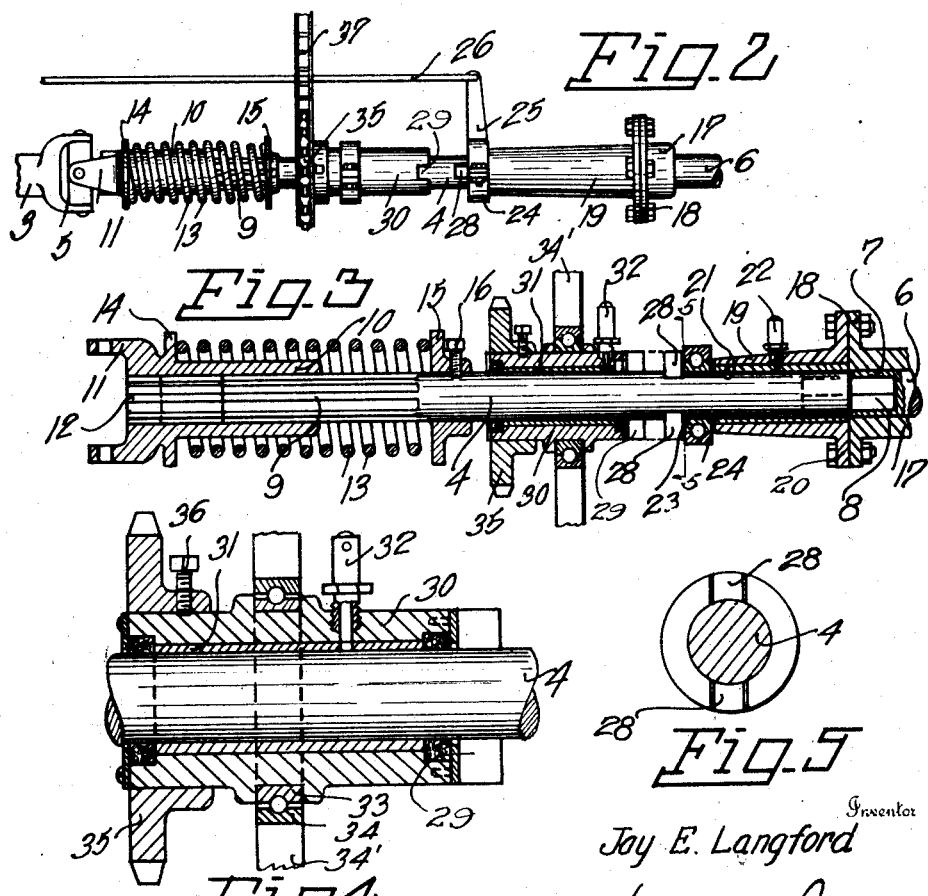
Inventor
Joy E. Langford Patented May 22, 1928.

1,670,457

UNITED STATES PATENT OFFICE.

JAY E. LANGFORD, OF SPOKANE, WASHINGTON.

AUXILIARY DRIVING MECHANISM.

Application filed January 31, 1927. Serial No. 164,793.

My present invention relates to an improved auxiliary driving mechanism which, while capable of various uses is designed particularly for use on automotive vehicles, as trucks. The power for the auxiliary driving mechanism is derived from the propeller shaft of the usual motor vehicle, and this power from the auxiliary mechanism may be applied for various purposes, as for instance in the nature of operating mechanism to a hoisting drum, as herein illustrated. The auxiliary driving mechanism is associated with and receives its power from the propeller shaft that usually extends longitudinally of the vehicle, and means are provided for longitudinally shifting a section of the propeller shaft, whereby that shaft-section is released from the propulsion mechanism of the vehicle and converted for use with the auxiliary driving mechanism. The propeller shaft for the vehicle is of course normally in position to perform its usual functions, and its movable section is controlled by a hand lever mechanism and clutch for disconnecting the propulsion mechanism and connecting the auxiliary driving mechanism, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of an automotive truck equipped with the mechanism of my invention, part of the chassis or frame being broken away for convenience of illustration.

Figure 2 is an enlarged view showing the longitudinally movable section of the propeller shaft and its connections.

Figure 3 is a sectional view of parts used in connection with the shiftable or movable shaft-section.

Figure 4 is an enlarged sectional view of the driving sprocket and its hub on the movable shaft-section.

Figure 5 is a transverse sectional view at line 5—5 of Figure 3 of the shaft-section showing a part of the clutch device.

In order that the general assembly and relation of parts may readily be understood I have illustrated in Figure 1 a conventional automotive truck and indicated its chassis or frame as 1, the rear propelling wheels as 2 driven from the propeller shaft which comprises the engine shaft 3, the longitudinally movable shaft-section 4 connected with the end of the engine shaft by a universal joint 5, and the rear propeller shaft-section 6.

Between the rear section 6 and the longitudinally movable section 4 a slidable joint is provided through the use of a socket 7 in the end of the shaft-section 6 and the polygonal or square head 8 on the end of the section 4. The rear section is driven through this joint when the sections 4 and 6 are connected, but when disconnected, the rear section of course is not rotated or revolved.

The other end of the movable shaft-section 4 is fashioned with exterior, longitudinally extending splines and grooves 9 that slide in the sleeve 10. This sleeve has integral therewith one of the knuckles 11 of the universal joint 5 and near its ends and extending throughout its length are arranged grooves 12 that form ribs complementary to the splines and ribs or grooves on the shaft. The sleeve thus revolves at all times with the shaft regardless of the position of the shaft with relation thereto, and the end of the shaft-section 4 is slidable longitudinally of the sleeve, when the head on the other end of the section 4 is backed out of its socket in the section 6.

The movable shaft-section 4 is normally held in operative relationship with the rear section 6 of the propeller shaft through the medium of a spring 13 which is interposed between a flange 14 on the head 11 of the sleeve 10 and a collar 15 secured by set bolt 16 in adjusted position on the shaft-section 4. As seen in Figure 3 the tendency of the spring is to normally urge the head 8 into its socket and hold it there so that the section 4 through the socket-joint transmits rotary motion to the section 6.

At the point of this slidable joint the section 4 and section 6 of the propeller shaft are supported by a bearing comprising a coupling bushing 17 on section 6, which bushing has a flange 18, and the section 4 is provided with a longer bearing bushing 19 which is fashioned with a flange 20 that is rigidly bolted to the flange 18. The section 4 is free to revolve in its bushing and a bearing 21 which is lubricated from the oil cup 22, is interposed between the shaft and its bushing as seen in Figure 3, parts 17 and 18 being supported as indicated at A in Figure 1.

The movable shaft-section 4 is slid longitudinally in the two spaced bushings or sleeves 10 and 19 and movement is applied to the shaft-section at the grooved ball bearing ring 23 fixed to and surrounding the shaft near the end of the bushing 19. This bearing ring forms part of a clutch device including the ring-yoke 24 and the clutch arm 25 rigid therewith. The clutch arm 25 is connected by a rod 26 extending forwardly of the vehicle, to the manually operated lever 27 that may be operated by the driver of the vehicle for shifting the section 4 longitudinally to disengage its polygonal head 8 from the socket 7 of the rear section of the propeller shaft.

This forward movement of the section 4 causes a pair of lugs or clutch members 28 fixed to the shaft-section, to engage in complementary notches 29 of a clutch sleeve 30 carried loosely on the shaft-section adjacent the ball bearing. The clutch sleeve is provided with a bearing sleeve 31 and an oil cup 32 is provided for furnishing lubricant to the clutch sleeve in order that the shaft-section may freely revolve therein under normal conditions.

The clutch sleeve is provided with an anti-friction bearing by use of the exterior ball bearing ring or collar 33 co-acting with the stationary bearing collar 34 and bracket 34'. On the exterior of the clutch sleeve a driving sprocket wheel 35 is fixed by means of the set bolt 36, and through the chain 37 is connected to a driven sprocket wheel 38 of the hoisting mechanism 39, the latter being driven when the shaft-section 4 has been shifted to the correct position.

Having thus fully described my invention, what I claim as new and desire to secure by Letters Patent is—

The combination with a driving shaft section, a driven shaft-section having a socket and an intermediate, longitudinally movable shaft section, of a slide-head at one end of the intermediate section for co-action with said socket in the adjoining end of the driven section, longitudinal ribs and grooves on the driving section and intermediate section constantly in slidable relation, means for moving the intermediate section, a driving member loose on the intermediate section and co-acting clutch members on said driving member and intermediate section.

In testimony whereof I affix my signature.

JAY E. LANGFORD.